United States Patent
Borker

(10) Patent No.: US 8,953,608 B1
(45) Date of Patent: Feb. 10, 2015

(54) METHOD AND SYSTEM FOR FRAME AGGREGATION

(71) Applicant: QLOGIC, Corporation, Aliso Viejo, CA (US)

(72) Inventor: Gaurav Borker, Goa (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 174 days.

(21) Appl. No.: 13/834,838

(22) Filed: Mar. 15, 2013

Related U.S. Application Data

(60) Provisional application No. 61/734,780, filed on Dec. 7, 2012.

(51) Int. Cl.
 *H04L 12/28* (2006.01)
 *H04L 29/08* (2006.01)

(52) U.S. Cl.
 CPC ...... *H04L 29/08045* (2013.01); *H04L 67/1097* (2013.01)
 USPC ........... 370/392; 370/391; 370/469; 370/252; 370/401; 370/474

(58) Field of Classification Search
 CPC ........ H04L 45/00; H04L 45/245; H04L 47/10
 USPC ......... 370/392, 391, 389, 469, 252, 394, 235, 370/401, 474
 See application file for complete search history.

(56) References Cited

U.S. PATENT DOCUMENTS

| | | | | |
|---|---|---|---|---|
| 7,474,676 B2 * | 1/2009 | Tao et al. | | 370/469 |
| 7,492,789 B2 * | 2/2009 | Shvodian | | 370/469 |
| 7,590,118 B2 * | 9/2009 | Giesberts et al. | | 370/392 |
| 7,697,522 B2 * | 4/2010 | Kliger et al. | | 370/389 |
| 8,509,193 B2 * | 8/2013 | Hassan et al. | | 370/332 |
| 8,649,379 B2 * | 2/2014 | Subramanian et al. | | 370/392 |

* cited by examiner

*Primary Examiner* — Rasheed Gidado
(74) *Attorney, Agent, or Firm* — Klein, O'Neill & Singh, LLP

(57) ABSTRACT

Method and system for aggregating frames at a network device coupled to computing system is provided. The network device includes an aggregator module that is configured to determine that a frame received by the device meets a first level eligibility criterion for aggregation, where the frame meets the first level eligibility criterion when the frame is a data frame for the I/O exchange identified as a large I/O operation; and a frame header meets an eligibility criterion. When the frame does not meet the first level eligibility criterion and an active aggregation exists for the exchange, then a previous aggregation data unit with an appended header and the received frame are sent to a transport layer for further processing. When the frame meets the first level eligibility criterion, the aggregator module checks a data structure maintained by the network device to determine that an aggregation flow exists for the exchange.

21 Claims, 6 Drawing Sheets

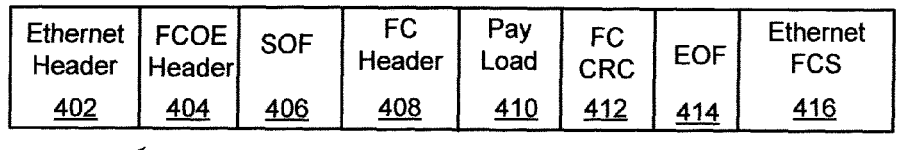
FIG. 4A
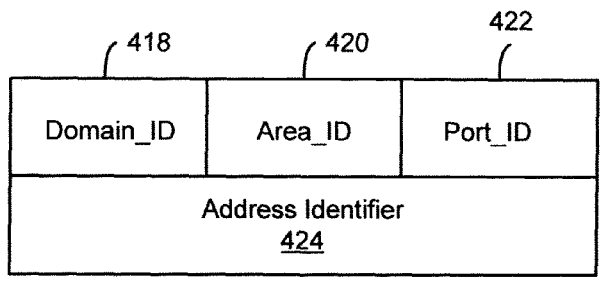
FIG. 4B
| Word/Bits | FC Header 408 ||||||
|---|---|---|---|---|---|---|
| | 31  24 | 23  16 | 15  08 | 07  00 |||
| | R_CTL 408C | | D_ID | 408A |||
| | CS_CTL 408K | | S_ID | 408B |||
| | Type 408J | | F_CTL | 408D |||
| | SEQ_ID 408E | DF_CTL 408L | SEQ_CNT | 408F |||
| | OX_ID | 408G | RX_ID | 408H |||
| | Parameter | | | 408M |||
FIG. 4C

ID

METHOD AND SYSTEM FOR FRAME AGGREGATION

CROSS-REFERENCE TO RELATED APPLICATIONS

This application claims priority under 35 U.S.C. §119(e) to U.S. Provisional Patent Application Ser. No. 61/734, 780, filed on Dec. 7, 2012, the disclosure of which is incorporated herein by reference in its entirety.

TECHNICAL FIELD

The present disclosure relates to computing systems and devices.

BACKGROUND

A computer network, often referred to simply as a network, is a group of interconnected computing devices that facilitates communication among users and allows users to share resources, for example, storage space at storage devices using a storage area network (SAN). Adapters, switches, and routers (jointly referred to as network devices) may be used to interconnect computing systems, storage devices and others.

Initiators are used to send input/output (I/O) requests for storing or reading data at storage devices that are managed by a computing system, typically referred to as a target controller. An initiator may be an adapter coupled to a computing system that sends out I/O requests for reading or writing data. A target may be an adapter coupled to the target controller that provides a response to the I/O request. Various transport protocols, for example, Fibre Channel, Fibre Channel over Ethernet, iSCSI (Internet over Small Computer System Interface) and others may be used for sending I/O requests.

For processing I/O requests, information is typically sent and received by network devices as frames or packets, depending on the protocol used. When a network device, for example, an adapter, receives a frame for an I/O operation, it typically has to interrupt a transport layer (or a computing system processor that may be the recipient of the frame) for further processing. When a number of frames are received for a large I/O operation, the number of interrupts can become inefficient. Continuous efforts are being made to efficiently process I/O requests for reading and writing data.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method is provided. The method includes receiving a frame as part of an input/output (I/O) exchange at a network device coupled to a computing system to read or write information; and determining that the frame meets a first level eligibility criterion for aggregation. The frame is eligible for aggregation when the frame is a data frame for the I/O exchange identified as a large I/O operation; and a frame header meets an eligibility criteria.

When the frame does not meet the first level eligibility criterion and an active aggregation exists for the exchange, then a previous aggregation data unit for the exchange with an appended header and the received frame are sent to a transport layer for further processing. When the frame meets the first level eligibility criterion, the method includes checking a data structure maintained by the network device to determine that an aggregation flow exists for the exchange; determining that the frame meets an active aggregation criterion, when an active aggregation and the aggregation flow exists for the exchange; aggregating a payload of the frame to an existing aggregation data unit when the active aggregation criterion is met; and sending the existing aggregation data unit with the aggregated payload and an appended header as an aggregated frame to the transport layer when the frame is the last frame of a sequence.

In another embodiment, a system having a computing system coupled to a network device that receives a frame for an input/output (I/O) exchange via a network connection is provided. The network device includes an aggregator module that is configured to: determine that the frame meets a first level eligibility criterion for aggregation, where the frame meets the first level eligibility criterion when the frame is a data frame for the I/O exchange identified as a large I/O operation; and a frame header meets an eligibility criterion.

When the frame does not meet the first level eligibility criterion and an active aggregation exists for the exchange, then a previous aggregation data unit with an appended header and the received frame are sent to a transport layer for further processing. When the frame meets the first level eligibility criterion, the aggregator module checks a data structure maintained by the network device to determine that an aggregation flow exists for the exchange; determines that the frame meets an active aggregation criterion, when an active aggregation and the aggregation flow exists for the exchange; aggregates a payload of the frame to an existing aggregation data unit when the active aggregation criterion is met; and sends the existing aggregation data unit with the aggregated payload and an appended header to the transport layer when the frame is the last frame of a sequence.

In yet another embodiment, a machine implemented method is provided. The method includes receiving a frame as part of an input/output (I/O) exchange at a network device coupled to a computing system and determining that the frame meets a first level eligibility criterion for aggregation, where the frame is eligible for aggregation when the frame is a data frame for the I/O exchange identified as a large I/O operation; and a frame header meets an eligibility criteria. When the frame does not meet the first level eligibility criterion and an active aggregation exists for the exchange, then a previous aggregation data unit with an appended header and the received frame are sent to a transport layer for further processing. When the frame does not meet the first level eligibility criterion and the active aggregation does not exist for the exchange, then the received frame is sent to the transport layer for further processing.

When the frame meets the first level eligibility criterion, the method includes checking a data structure maintained by the network device to determine that an aggregation flow exists for the exchange; starting the aggregation flow, when one does not exist for the exchange and using the received frame as a first frame for a new aggregation data unit; and determining that the frame meets an active aggregation criterion, when an active aggregation and the aggregation flow exists for the exchange. When the active aggregation does not exist for the exchange, then a payload of the frame that meets the first level eligibility criterion becomes a first frame for the new aggregation data unit in an aggregation buffer.

The method further includes aggregating a payload of the frame to an existing aggregation data unit when the active aggregation criterion is met; and sending the existing aggregation data unit with the aggregated payload and an appended header to the transport layer when the frame is the last frame of a sequence.

This brief summary has been provided so that the nature of the disclosure may be quickly understood. A more complete understanding of the disclosure can be obtained by reference to the following detailed description of the various embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts:

FIGS. 4A-4C show examples of frame formats that may use the embodiments disclosed herein.

DETAILED DESCRIPTION

Figure 1:
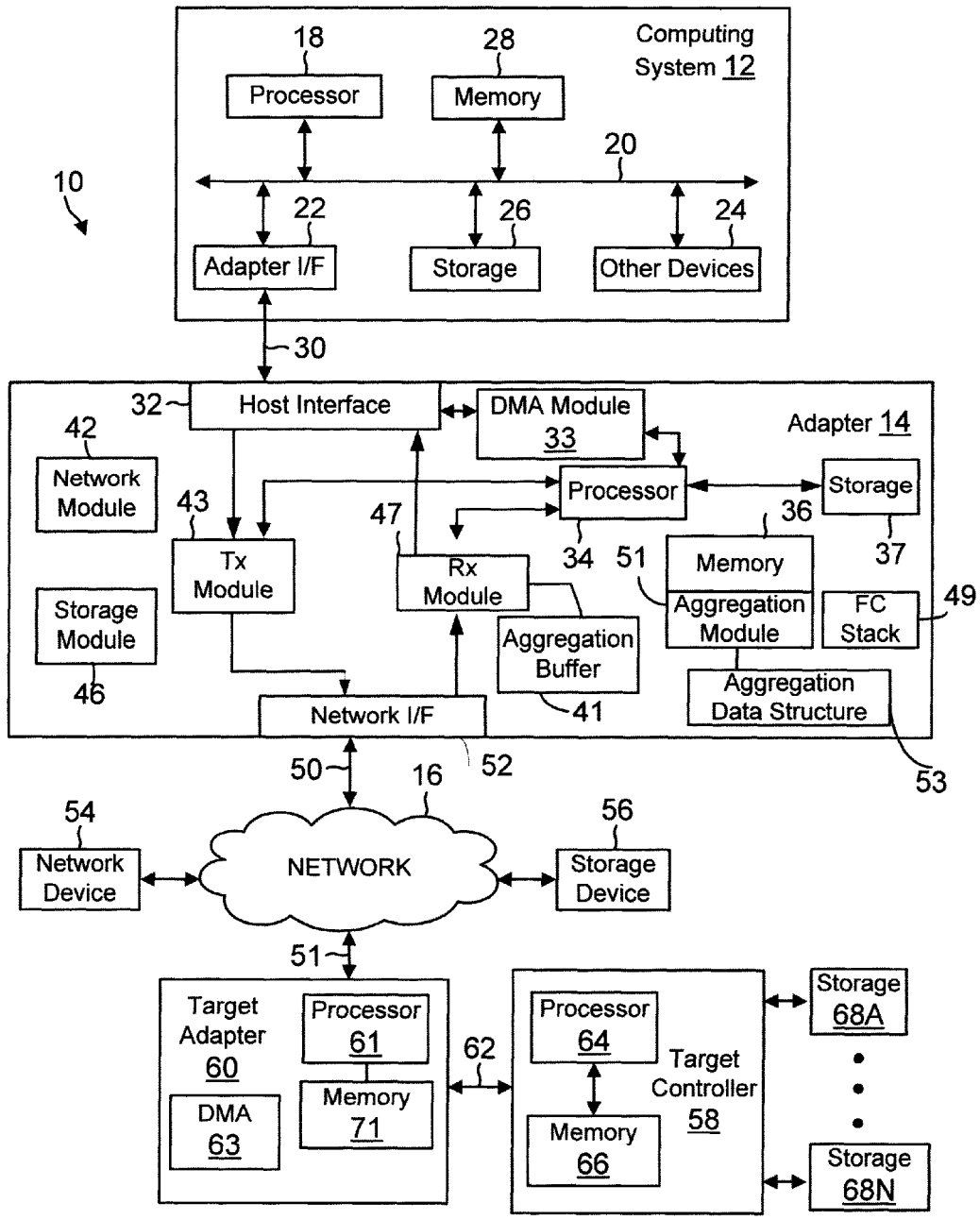
FIG. 1 is a system diagram showing components using the embodiments of the present disclosure.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.). The embodiments disclosed herein may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

FIG. 1 is a block diagram of a system 10 configured for use with the present embodiments. The system 10 may include one or more computing system 12 (may also be referred to as "host system 12" or server 12) coupled to an adapter 14 (may also be referred to as initiator adapter 14) that interfaces with a network 16. The network 16 may include, for example, additional computing systems, servers, storage systems, etc.

The computing system 12 may include one or more processors 18, also known as a central processing unit (CPU) coupled to a memory 28 via a computer bus (or interconnect) 20. The processor 18 executes computer-executable process steps out of memory 28. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The computer bus 20 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

Memory 28 provides the processor 18 with access to memory storage. Memory 28 may include random access main memory (RAM). When executing stored computer-executable process steps from a storage device, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

The computing system 12 may further include a local storage device 26, which may be for example a hard disk, a CD-ROM, a non-volatile memory device (flash or memory stick) or any other device. Storage 26 may store operating system program files, application program files, and other files. Some of these files are stored at storage 26 using an installation program. For example, the processor 18 may execute computer-executable process steps of an installation program so that the processor 18 can properly execute the application program. The computing system 12 also includes other devices and interfaces 24, which may include a display device interface, a keyboard interface, a pointing device interface and others.

The adapter 14 may be configured to handle both network and storage traffic. Various network and storage technologies may be used to handle network and storage traffic. Some common protocols and network technologies are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 100 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage networking technology used to access storage systems is called Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_Port establishes a connection to a Fabric element (e.g., a switch) having a fabric port or F_Port.

A new and upcoming standard, called Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 14 shown in FIG. 1 may be configured to operate as an FCOE adapter and may be referred to as FCOE adapter 14. QLogic Corporation, the assignee of the present application, provides one such adapter. The illustrated adapter 14, however, does not limit the scope of the present embodiments. The present embodiments may be practiced with adapters having different configurations.

Input/Output (I/O) operations to read data from a storage device and write data to the storage device are typically based on a client/server model. Typically, the client is a host computing system such as a file server that issues a read or write command using an adapter. The server may be a storage array that responds to the client request.

The following introduces some of the basic terms used during an I/O operation: (a) "Exchange" means the operations needed to perform a data read or write. An exchange typically includes three operational phases: command phase, data movement phase and response phase. (b) "Initiator"—Typically the client is the initiator that initiates a read or write command. (c) "Target"—Typically a storage array that accepts a read or write command and performs the requested operation.

In a typical I/O exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete.

With continued reference to FIG. 1, computing system 12 includes an adapter interface 22 that couples computing system 12 to the adapter 14 via a link 30. The adapter 14 interfaces with the computing system 12 via the link 30 and a host interface 32. In one embodiment, the host interface 32 may be a PCI Express interface coupled to a PCI Express link (for example, 30).

The adapter 14 may also include a processor 34 that executes firmware instructions out of memory 36 to control overall adapter 14 operations. Direct memory access (DMA) module 33 may be used by adapter 14 to control access to link 30 for performing DMA operations, e.g. to send data to processor 18 or receive data from processor 18.

The adapter 14 may also include storage 37, which may be for example non-volatile memory, such as flash memory, or any other device. The storage 37 may store executable instructions and operating parameters that can be used for controlling adapter operations.

The adapter 14 includes a network module 42 for handling network traffic via a link 50. In one embodiment, the network module 42 includes logic and circuitry for handling network packets, for example, Ethernet or any other type of network packets.

The adapter 14 may also include a storage module 46 for handling storage traffic to and from storage devices 56 and 68A-68N. In one embodiment, the storage module 46 is configured to process storage traffic according to the Fibre Channel storage protocol, or any other protocol, for example, iSCSI.

The adaptive embodiments of the present disclosure are not limited to adapter 14 having both and separate network and storage modules. For example, adapter 14 may have an integrated module that can handle either network and storage traffic, or adapter 14 may only have a storage module similar to a host bus adapter.

The adapter 14 also includes a network interface 52 that interfaces with a link 50 via one or more ports (not shown). The network interface 52 includes logic and circuitry to receive information via the link 50 and pass it to either the network module 42 or the storage module 46.

In one embodiment, adapter 14 includes a transmit (Tx) module 43 for transmitting information from adapter 14 to other devices via link 50. The transmit module 43 may be used by the network module 42 and/or storage module 46. In another embodiment, the storage and network module may have dedicated transmit modules.

The adapter 14 also includes a receive (Rx) module 47 for receiving and processing frames that are received via network link 50. The frames may be received complying with the Fibre Channel protocol, FCoE protocol or any other protocol type that is supported by adapter 14.

As described below in detail, typically a frame includes a header portion and a data or payload portion. Rx module 47 has memory storage locations (may be referred to as receive buffers) for temporarily storing frames. One such buffer is referred to as an aggregation buffer 41. The aggregation buffer 41 may be used to store the data portions for a plurality of frames for an I/O exchange based on a determination that is made by an aggregation module 51 that maintains an aggregation data structure 53 that is also described below in detail. The data portion for one or more frames may be assembled into an aggregation data unit 55 that is described below with respect to FIG. 2E. In one embodiment, as described below in detail, the aggregation module 51 adds a header 59 and a trailer 61 to the aggregation data unit 55. The aggregation data unit with the header and trailer (may jointly be referred to as header) is then referred to herein as an "aggregated frame" 57.

Adapter 14 may also execute a stack 49 (shown as a FC stack or a Fibre Channel stack) or a portion thereof. The FC stack 49 is used to process Fibre Channel frames received from other devices, as described below in detail. Portion of the FC stack 49 may be referred to as a transport layer 49F as described below in detail.

Adapter 14 may operate as an "initiator" for sending out I/O requests to a target controller 58 via a target adapter 60. The target adapter 60 is similar to the initiator adapter 14 and includes a processor 61 that has access to memory 71 that may be used to store firmware instructions or any other instruction. Target adapter 60 is coupled to network 16 via a link 51 similar to link 50. Target adapter 60 is coupled to the target controller 58 via a link 62 similar to link 30 described above. Target adapter 60 includes a DMA module 63 that manages access to link 62 to send and receive data using DMA transfer operations. Target controller 58 may be a computing system similar to computing system 12 having a processor 64 and a memory 66. Target controller 58 manages storage devices 68A-68N for reading and writing data for I/O requests.

Figures 2A, 2B:
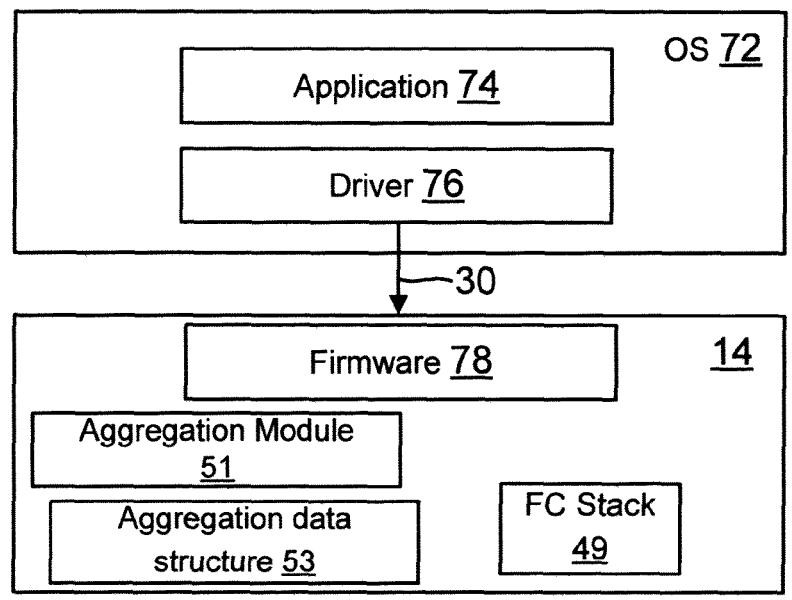
FIG. 2A is a block diagram of an architecture used by the system of the present disclosure.
FIG. 2B shows a block diagram of a data structure used to track aggregation for a plurality of I/O requests, according to one embodiment.

FIG. 2A shows a block diagram of an architecture that may be used by or with the components of system 10. For example, the architecture of FIG. 2A includes an operating system (OS) 72 that controls the overall operation of a computing system, for example, 12 and target controller 58. OS 72 may be Windows based, Linux based, Solaris based or any other OS type.

A computing system may execute an application 74. Application 74 when executed by computing system 12 may be a client application, for example, a database application, web server, e-mail application, and others. Application 74 may be used to generate a request to read and write information.

Application 74 may also be a management application executed by a computing system used as a management console (not shown) for managing the various components in system 10. In one embodiment, application 74 may be used to configure a storage space as a logical entity (logical unit number (LUN). Each LUN is uniquely identified by an identifier (LUN ID) and is associated with physical storage space. A LUN is typically divided into logical block addresses (LBAs) that are used by an application to read and write data to storage locations. The LBAs are mapped with actual physical storage to read and write data. To generate an I/O request to read or write data at a storage location, adapter 14 uses a LUN identifier and LBA range.

Application 74 when executed by a target controller 58 may be an application for managing various storage devices 68A-68N. To communicate with adapter 14 (or 60), application 74 uses a driver 76. The driver may be referred to as an adapter driver. To control the operations of adapter 14 (and target adapter 60), an adapter processor executes firmware instructions 78 out of adapter memory (36 or 71).

Adapter 14 and/or target adapter 60 may include the aggregation module 51 that may be executed by a hardware component, a software component or a combination thereof. When executed as a software module, the aggregation module 51 may be a part of firmware 78 or operate as a separate module.

Figure 2C:
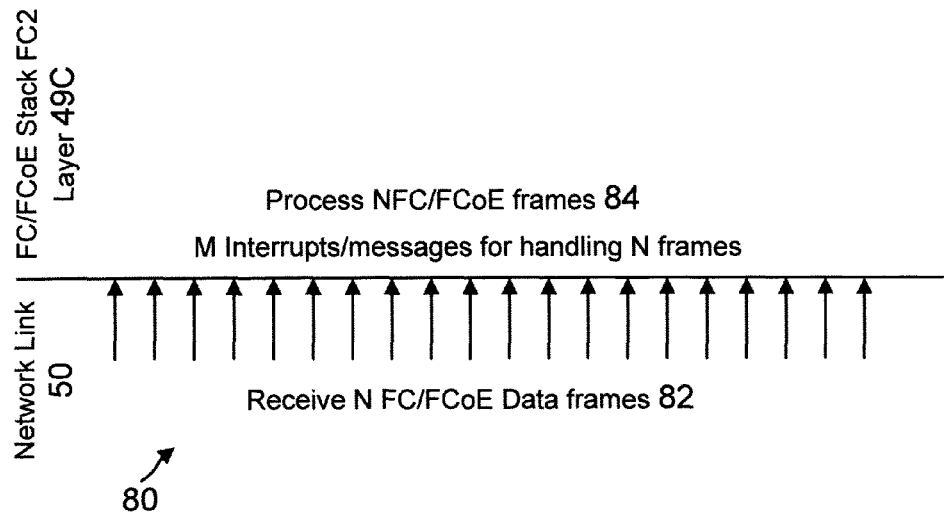
FIG. 2C shows an example of conventional frame processing.

FIG. 2C shows an example 80 of a conventional system processing individual frames for a particular exchange. As an example, N data frames may be received for a same I/O exchange via network 50. The I/O exchange may be categorized as a "large" I/O operation. A large I/O is one where data that is requested to be read or written is "large" in size, for example, a few hundred Kbytes to Megabytes or more. The term large as used herein is programmable and may vary. A large I/O, typically results in a large number of data PDUs that are sent between an initiator and a target. For example, Fibre Channel has a standard maximum payload size of 2112 bytes, and for a 1 Mb I/O, 497 data frames are used for transferring 1 Mb of data.

When frames are received via network 50, lower layers interrupt a FC 2 layer 49C that is described below in detail with respect to FIG. 3. The lower layers may use M interrupts for N data frames. The FC2 layer 49C then processes each N frame individually, including header parsing, protocol level processing, maintaining the state for the I/O exchange and managing receive buffers in the Rx module 47. This is undesirable and slows down overall I/O processing.

Figure 2D:
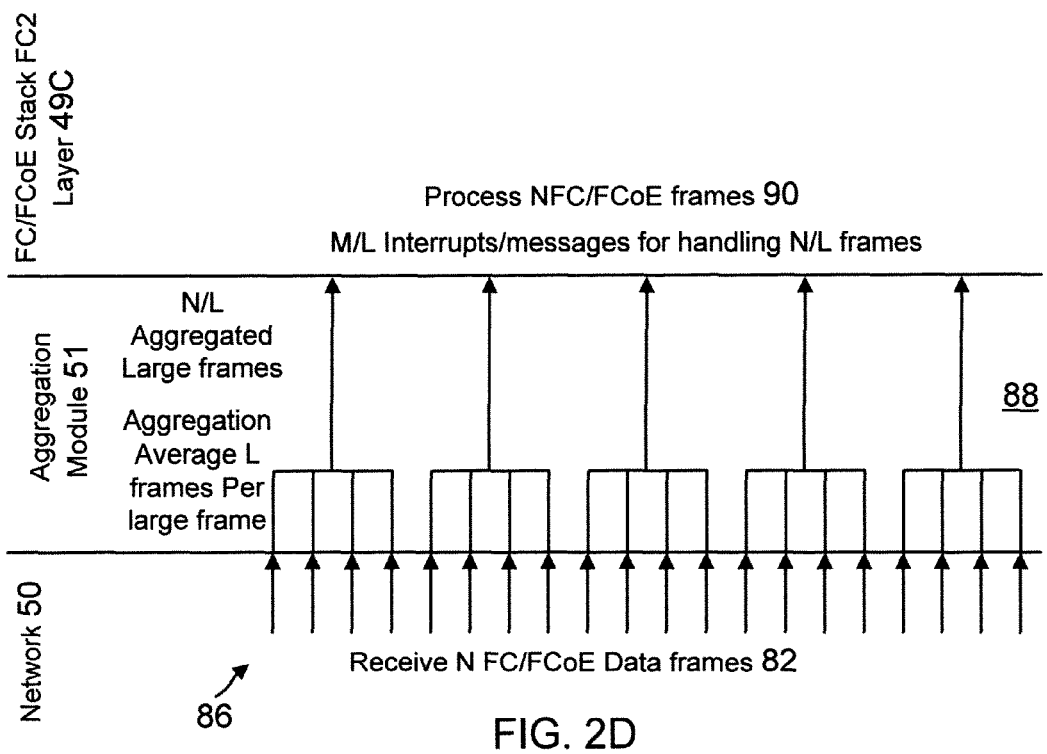
FIG. 2D shows an example of frame aggregation, according to one embodiment.
Figure 2E:
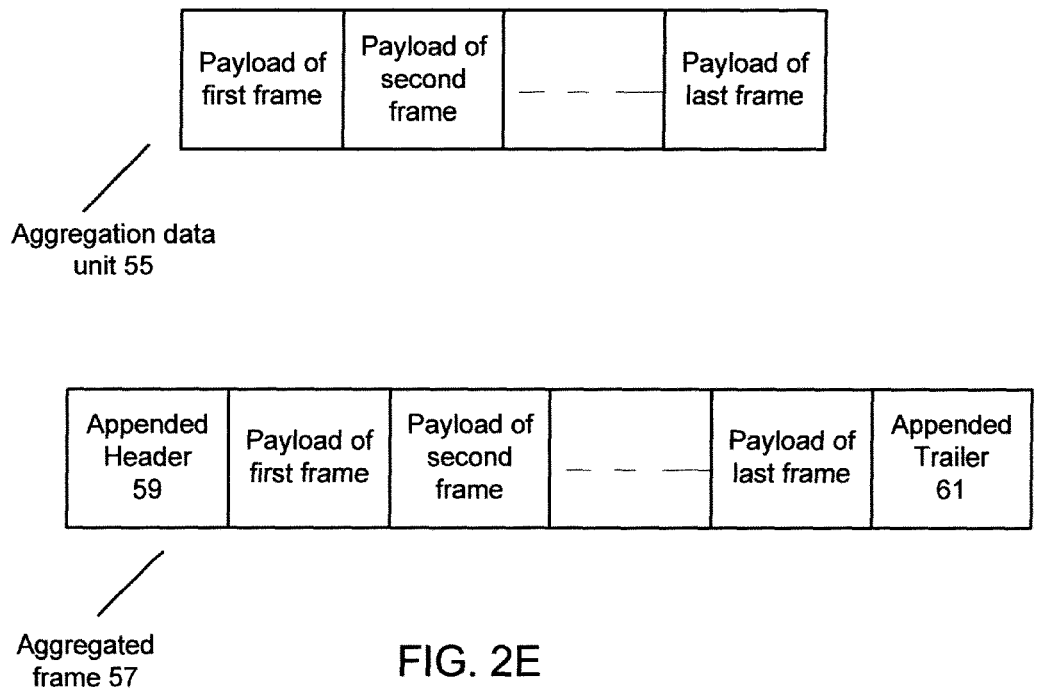
FIG. 2E shows an example of an aggregation data unit and an aggregated frame with an appended header and trailer, according to one embodiment.

FIG. 2D now shows an example 86 where N frames 82 are received via network 50. The aggregation module 51 aggregates N frames based on certain criteria that is described below. As an example, aggregation module 51 may aggregate an average of L number of frames. This reduces the number of interrupts from M to M/L. This is efficient compared to the conventional systems because the FC 2 layer 49C now has to process fewer frames i.e. N/L number of frames and deal with fewer interrupts i.e. M/L number of interrupts compared to M number of interrupts. L, N and M are positive numbers.

In one embodiment, for aggregating data frames, a data portion of an eligible received frame is appended at the end of an active aggregation in the aggregation buffer 41. This is shown as aggregation data unit 55 in FIG. 2E. When the aggregation is complete, the appropriate header 59 and trailer 69 are appended to the aggregation data unit 55. The aggregated frame 57 is then passed on to the FC 2 49C. In one embodiment, the aggregation is performed on frames whose cyclic redundancy code (CRC) has been verified by the adapter 14. The CRC may be verified by the Rx module 47 or any other component.

The aggregation approach of the present disclosure may be applied to an adapter or any network device that is executing the transport layer 49F i.e. the portion of the FC stack that may also be referred to as the Fibre Channel Protocol (FCP). The data portion of the frames is aggregated by the aggregation module 51 before they are provided to the transport layer 49F.

The embodiments disclosed herein are applicable to an environment when computing system 12 executes the transport layer 49F. In that environment, adapter 14 operates as an aggregator for the computing system 12.

Figure 3:
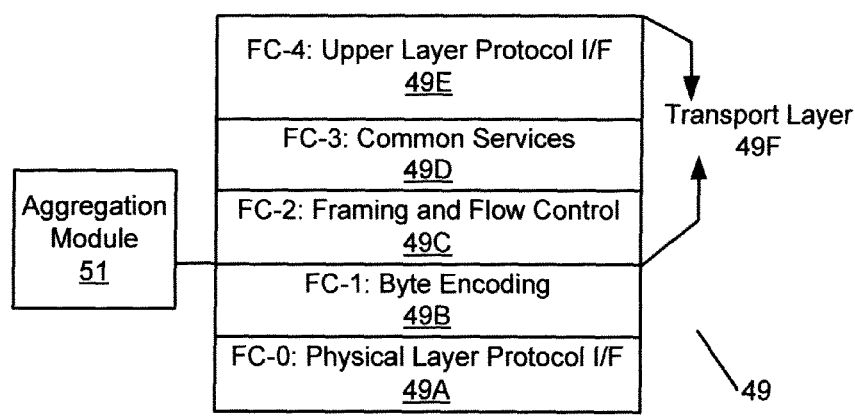
FIG. 3 shows an example of a Fibre Channel stack.

FIG. 3 shows the FC stack 49 portions of which may be executed by adapter 14 components (for example, by processor 124 and network 52 or any other component) and/or processor 18. The embodiments described herein are not limited to the FC stack and may be applied to any similar transport protocol. Furthermore, the embodiments disclosed herein are not limited to any particular entity executing any portion of the FC stack 49. The FC stack 49 has 5 layers, the FC 0 layer 49A-FC 4 layer 49E. The following provides a brief introduction of the various layers:

FC0 49A is defined by the Fibre Channel specification as the physical layer, which includes cables (fiber optics, twisted-pair), connectors and others. This layer may be executed by the network interface 52 (or port).

FC1 layer 49B is defined as the data link layer. This layer implements the 8B/10B encoding and decoding of signals.

FC2 layer 49C is defined as the network layer that is placed above FC 1 layer 49B. This layer defines the main Fibre Channel framing, addressing, and control protocols. The aggregator module 51 is above the FC 1 layer 49B and below FC2 layer 49C, as shown in FIG. 3.

FC3 layer 49D is an auxiliary layer that provides common services like encryption or RAID related.

FC4 layer 49E is the protocol mapping layer where other protocols, such as SCSI (Small Computer Systems Interface), are encapsulated into an information unit for delivery to FC2 and transmission across a Fibre Channel network. This layer provides flexibility to Fibre Channel as a networking technology compatible with other technologies. For clarity purposes, the transport layer 49F includes layers 49C-49E.

The FCoE stack has not been described herein in detail. The FCoE stack includes a media access control (MAC) layer and a physical layer in lieu of FC0 49A and FC1 49B. The FCoE stack also includes a mapping layer that maps the upper layers of the FC 49 stack to Ethernet.

In one embodiment, the transport layer 49F may be configured such that a maximum frame size for processing frames can be greater than the standard maximum frame size that is typically accepted and processed by the transport layer 49F. In such an instance, the transport layer 49F will expect a SEQ_CNT across various data frames within a sequence to increase by the number of frames that are aggregated instead of increasing by one. For example consider two aggregation data frames A and B whose data payload has been aggregated and then passed in that order by the aggregating module 51 to the FC2 layer 49C. If a number of frames aggregated in frame A is 5 and SEQ_CNT of the first frame aggregated in frame A is 3. Then the SEQ_CNT in frame B will be 3+5=8. In one embodiment, as described below in detail, the transport layer 49F may skip verification of CRC for the aggregated large frame because individual frame CRC is already verified.

FIG. 4A shows an example of an FCoE frame (or packet, used interchangeably throughout this specification) format 400 for processing network and storage traffic, according to the present embodiments. The FCoE packet 400 includes an Ethernet header 402. In one embodiment, the Ethernet header 402, which includes the Ethernet type, may be fourteen bytes in length, for example. The Ethernet header may also include optional Tag fields (not shown). The FCoE packet 400 also includes an FCoE header 404 that includes a number of reserved fields. A start of frame (SOF) 406 indicates the beginning of the embedded Fibre Channel frame and may be one byte, for example.

The FCoE packet 400 may also include a Fibre Channel header (FC Header) 408 that may be 24 bytes long with a payload 410. The payload 410 is also referred to herein as the data for a frame. The payload 410 is aggregated in the aggregation buffer 41 to create an aggregation data unit 55, as described below in detail. The Fibre Channel cyclic redundancy code (CRC) 512 may be 4 bytes and the Fibre Channel end of frame (EOF) 414 may be 1 byte in size. The EOF 414 indicates the end of the embedded Fibre Channel frame. The Ethernet FCS 416 is inserted after the Fibre Channel EOF 414. The EOF may be referred to herein as a trailer.

FIG. 4B shows a standard 24-bit Fibre Channel address identifier 424. The address identifier 424 includes a Domain_ID 418, an Area_ID 420, and a Port_ID 422. The Domain_ID 418 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 420 is an Area identifier based on the middle 8 bits of the 24-bit Fibre Channel address. The Area_ID 420 applies either to (a) one or more N_Ports within and attached to a Fibre Channel switch, or (b) to an Arbitrated Loop of NL_Ports attached to a single FL_Port.

The Port_ID 422 is the lower 8-bits of a Fibre Channel address. The Port_ID 422 applies to both (a) a single N_Port and virtualized N_Port within a Domain/Area and (b) the valid AL_PA of a single NL_Port or FL_Port on an Arbitrated Loop.

FIG. 4C shows an example of the FC header 408 of FIG. 4A. The aggregation module 51 adds an appropriate Fibre Channel header 59 to an aggregation data unit 55 having the payload for more than one frame. The following frame header fields that are used in the present methods are:

D_ID 408A-A 24-bit Fibre Channel frame header field that contains the destination address for a frame. A frame which is not a first frame for an aggregation operation is eligible for aggregation when it has the same D_ID as the first frame of the aggregation operation. The term aggregation operation means aggregating the payload for a plurality of frames by the aggregator module 51. The process for the aggregation operation is described below with respect to FIG. 5.

S_ID 408B—A 24-bit Fibre Channel frame header field that contains the source address for a frame. A frame which is not the first frame for an aggregation operation is eligible for aggregation when it has the same S_ID as the first frame of the aggregation operation.

R_CTL 408C—A routing control flag in a Fibre Channel header. A value of 0x1 indicates that it is a solicited data frame. Other values indicate if a frame is a link control frame.

F_CTL 408D—A frame control flag. When bit 3 of this field is set it indicates a relative offset that is present in a parameter field 408M.

SEQ_ID 408E—Provides a sequence number for a frame of an exchange. In one embodiment, a frame which is not the first frame for an aggregation operation is eligible for aggregation, if it has the same SEQ_ID as of the first frame of the aggregation operation.

SEQ_CNT 408F—Provides the number of frames that have been transmitted in a sequence. A frame which is not the first frame for an aggregation operation is eligible for aggregation, when the SEQ_CNT is one greater than a last frame that is aggregated.

OX_ID 408G: This is an originator exchange identifier that is assigned by an initiator. A frame which is not the first frame for an aggregation operation is eligible for aggregation when it has the same OX_ID as the first frame of the aggregation operation.

RX_ID 408H—This is an exchange identifier that is generated by a target. A frame for aggregation has the same RX_ID as the first aggregated frame. A frame which is not the first frame for an aggregation operation is eligible for aggregation when it has the same RX_ID as the first frame of the aggregation operation.

CS_CTL 408J—This bit is used to provide quality of service.

Type 408K—This field is used to indicate a payload. For example, a value of 0x08 indicates a SCSI-FCP payload.

DF_CTL 408L—This is field is used to indicate presence of optional headers and their size.

Parameter 408M—This is typically used to provide a relative offset in a sequence. A frame which is not the first frame for an aggregation operation is eligible for aggregation when its parameter field is equal to a next expected relative offset.

When a frame is received by adapter 14, the frame may be eligible for aggregation (may be referred to as basic frame eligibility or first level eligibility) when: (a) The frame is a solicited data frame that corresponds to a large I/O exchange operation; and (b) the CRC for the frame has been verified. In one embodiment, the RX module 47 performs the CRC verification when the frame is received using the physical layer.

When a received frame is a Fibre channel frame, then it meets the basic eligibility criteria when the R-CTL (508C) has a value of 0x01, the Type field (508K) has a value of 0x08, and the FC_CTL (508D) bit 3 is set indicating a relative offset in the parameter field. If the frame is an FCoE frame, then the FCoE header of the received frame has the expected Version number, has one valid value for a start of frame (SOF) and one valid value for the end of frame (EOF).

When a frame for an exchange meets the basic eligibility requirement for aggregation and an active aggregation exists for the exchange, the aggregation module 51 determines if the frame meets an aggregation criterion for the active aggregation. The term active aggregation for an exchange means that currently at least payload of one frame has been aggregated for the same exchange. Within an I/O exchange operation, there can be a number of aggregations. Each time an aggregation is complete and sent to the transport layer 49F, the aggregation is marked as inactive. After this when the payload of a first frame of a next aggregation (within the same exchange) is placed into the aggregation buffer 41, the aggregation state is re-initialized and the aggregation becomes active.

If a received frame meets the basic eligibility for aggregation and the corresponding exchange has an active aggregation then frame can be aggregated into the active aggregation when it meets the following aggregation criterion: (a) A maximum aggregation frame size would not be surpassed if the received frame is aggregated into the active aggregation; (b) S_ID, D_ID, OX_ID, RX_ID and SEQ_ID values are the same as that of a first frame of the active aggregation. (c) SEQ_CNT is greater than one from the last aggregated frame of the active aggregation; and (d) the relative offset in the parameter field is the relative offset in the last aggregated frame plus a size of data in the last aggregated frame of the active aggregation.

For aggregating FCoE frames, in addition to the S_ID, D_ID, OX_ID, RX_ID and SEQ_ID, the MAC (media access control) headers should have the same source/destination MAC address and a virtual local area network (VLAN) tag for all the frames of an aggregation operation should be equal to the value of a first frame for an active aggregation.

If a frame meets the basic frame eligibility for aggregation, but the corresponding exchange does not have yet have an active aggregation, then a new aggregation data unit may be started for the frame and the aggregation is then marked as being active.

In one embodiment, multiple exchanges may be active for a network device port (e.g. an N_Port). Thus frames corresponding to the multiple exchanges may have to be aggregated simultaneously and separately. The aggregation module 51 maintains a state for each exchange and these be referred to as aggregation flows. The aggregation module 51 uses a data structure 53 to maintain the state for each exchange. Data structure 53 may store various fields, for example, field 53A identifies the exchange (shown as XID1-XIDN) and column 53B may store the state for an aggregation flow for each exchange. The state information may include an indicator for indicating that an aggregation flow is active; expected header fields for verifying that aggregation criteria has been met for an active aggregation; and a state based on active aggregation for creating headers/trailers for an aggregation unit.

In one embodiment, column 53B may be used for verifying the aggregation criteria for a frame that meets the basic frame eligibility and for which an active aggregation already exists. As an example, for an exchange/flow with an active aggregation, column 53B may store the expected valid values for the S_ID, OXID, RX_ID, SEQ_ID, SEQ_CNT and an expected relative offset for verifying the aggregation eligibility for a next frame that can be aggregated. The expected S_ID D_ID, OXID, RXID and SEQ_ID are the same as the first frame that is a part of the aggregation operation. SEQ_CNT is one greater than the SEQ_CNT in the last frame of the aggregation i.e. it starts from SEQ_CNT of the first frame of the aggregation +1 and is incremented by one each time the payload of a frame is brought into the aggregation. The expected relative offset is relative offset of the last frame in the aggregation plus the data size in the last frame i.e. it starts at the relative offset in the first frame of the aggregation plus size of the data in first frame of the aggregation and increases by the size of data in a frame every time it is aggregated.

The S_ID, D_ID, OX_ID, RX_ID, SEQ_ID, SEQ_CNT and relative offset in the PARAMETER field of a received frame are compared against the expected values in column 53B to determine if the aggregation criterion for the active aggregation is met. It is noteworthy that column 53B may also store the state information for the active aggregation based on which a header/trailer for the aggregation data unit can be created.

Figure 5:
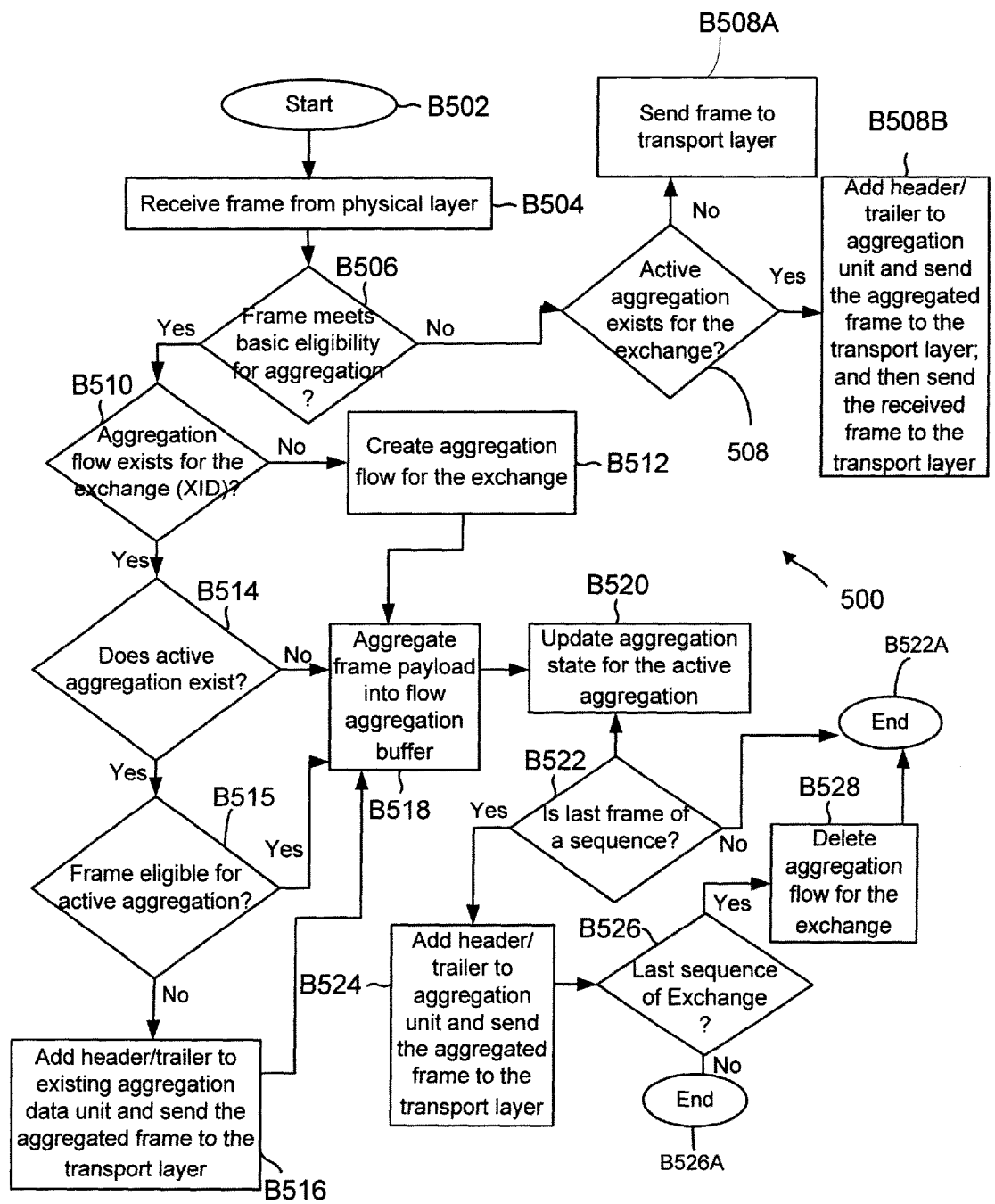
FIG. 5 shows an aggregation operation, according to one embodiment.

FIG. 5 shows an aggregation process (or operation) 500, according to one embodiment. The process begins in block B502. During this block, the initiator adapter 14 and target adapter 60 are operational and ready to receive a data frame. The data frame may be received by the initiator adapter 14 from the target adapter 60 in response to a read request. The data frame may also be received by the target adapter 60, in response to a write request from the initiator adapter 14.

In block B504, a frame is received from the physical layer. The frame is a part of an exchange that is established between the initiator adapter 14 and the target adapter 60.

In block B506, the aggregation module 51 determines if the frame meets the basic eligibility requirement for aggregation. As described above, a frame meets the basic eligibility (or first level eligibility) requirement when: (a) The frame is a SCSI-FCP, solicited device data frame that corresponds to a large I/O exchange operation; (b) the CRC for the frame has been verified and (c) The frame headers meet the eligibility criteria. For example, for a Fibre channel frame, the R-CTL (508C) has a value of 0x01, the Type field (508K) has a value of 0x08, and the F_CTL (508D) bit 3 is set indicating a relative offset in the parameter field. If the frame is an FCoE frame, then the FCoE has the expected Version number, has one valid value for a start of frame (SOF) and one valid value for the end of frame (EOF).

If the frame is not eligible, then in block B508, the process determines, if any active aggregation for the exchange to which the frame belongs exists. The aggregation module 51 determines that by using data structure 53. If not, then the received frame is sent to the transport layer in block B508A.

If active aggregation exists, then in block B508B, an appropriate header 59 and a trailer 61 are added to the existing aggregation data unit for the active aggregation for the exchange. The resulting aggregated frame is then sent to the transport layer 49F. Thereafter, the frame received in block B504 is also sent to the transport layer 49F.

The header/trailer fields would depend on the frame type and may vary from frame to frame. The following provides an example, of adding a header 59 to an aggregation data unit 55. Assume that the payload of received frame A, frame B and frame C are aggregated in that order and the frame C is the last frame of a sequence. Then the aggregation module 51 using data structure 53 adds the following header 59 to the aggregation data unit 55: (a) R_CTL in the appended header is set to: 0x01, indicating solicited device data frame; (b) D_ID in the appended header is the same as in all the three frames; (c) S_ID in the appended header is the same as all the three frames; (d) Type field in the appended header is set to 0x08 to indicate SCSI-FCP as in all the three frames; (e) F_CTL bits in the appended header may be set as follows: Bit 19 is set indicating last frame of sequence; Bit 20 is set if the three frames belong to last sequence of exchange; Bit 21 is set if the three frames belong to first sequence of exchange; Bit 22 is set/clear based on whether the three frames are sent by the sequence initiator or sequence recipient; Bit 23 is set/clear based on whether the frames are sent by the originator of the exchange or responder of the exchange; Bit 16 is the same as frame C indicating sequence initiative transfer and Bit 3 is set to indicate relative offset present as in all the three frames. (f) SEQ_ID in the appended header is the same as all the three frames. (g) SEQ_CNT in the appended header is the same as the one for the first frame, i.e. frame A in this example. (h) OX_ID in the appended header is the same as all the three frames. (i) RX_ID in the appended header is the same as all the three frames. (j) Parameter (Relative offset): The relative offset in the appended header is the same as that of the first frame in aggregation i.e. frame A in this example.

If the frames are FCoE frames, then the appended header has the same Ethernet header fields of the three frames. For the FCoE header, the Version is the same as all the three frames. SOF is SOFn, since the first frame, i.e. frame A may not be the first frame of the sequence. EOF i.e. trailer 61 is set to EOFt, since frame C is last frame of sequence.

Referring back to FIG. 5, if in block B506, if the frame meets the basic eligibility, then in block B510, the aggregation module 51 determines if an aggregation flow for an exchange exists at data structure 53 that has been described above in detail. If an entry does not exist, then in block B512, an entry for the exchange is created. The entry is used to track the aggregation for the exchange, the process then moves to block B518.

If an entry already exists, then in block B515, the aggregation module 51 determines if active aggregation exists for the exchange. This is determined by checking data structure 53B. If the active aggregation does not exist, then the payload of the frame is placed in aggregation buffer 41 and it becomes the first frame of a new active aggregation in block B518.

If an active aggregation does exist, then in block B515, the process checks to determine if the frame is eligible for active aggregation. As described above, when the frame is a Fibre Channel frame, it is eligible for active aggregation, when (a) The maximum aggregation frame size would not exceed if the received frame were aggregated; (b) The S_ID, OX_ID, RX_ID and SEQ_ID values are the same as that of a first frame of the active aggregation; (c) the SEQ_CNT is one greater than a last frame of the active aggregation; and (d) the Relative offset in the parameter field is the relative offset of the last frame plus the size of data in the last frame of the active aggregation.

If the frame is not eligible for active aggregation, then an appropriate header 59/trailer 61 for an existing aggregation data unit 55 is added and the resulting aggregated frame 57 is sent to the transport layer 49F for further processing. Thereafter, the payload of the received frame is also sent to the aggregation buffer 41 so that a new aggregation data unit is started based on the payload of the received frame in block B504.

If the aggregation criterion is met, then in block B518, the payload of the received frame is stored at the aggregation buffer 41.

In block B520, the aggregation state for the active aggregation is updated at data structure 53 so that future frames for the active aggregation can be performed. It is noteworthy that every time after a payload becomes a part of an aggregation unit, the aggregation state for the active aggregation is updated at data structure 53. The aggregation state is used: (a) To verify if an eligible frame belonging to a flow meets the active aggregation criteria. This state is valid when there is an existing active aggregation. The state is initialized based on a first frame of an aggregation unit that may have more than one frame. The fields in data structure 53B for a Fibre Channel frame are expected S_ID, D_ID, OX_ID, RXID, SEQ_ID, SEQ_CNT and relative offset. For an FCoE frame the state would also include MAC addresses and VLAN tag values as well. (b)) To store information regarding the active aggregation based on which a frame header 59 and trailer 61 for an aggregation data unit 55 is added to create an aggregated frame 57.

The expected S_ID, D_ID, OX_ID, RX_ID and SEQ_ID are initialized based on a first frame of an aggregation unit. The expected SEQ_CNT is initialized based on the first frame of the aggregation unit and incremented by one with every aggregated frame payload. The expected relative offset is initialized based on the first frame of the aggregation unit and then incremented by the size of the frame data every time a frame is aggregated. The expected MAC addresses and VLAN tag are initialized based on a first frame of the aggregation unit.

In block B522, the aggregation module 51 determines if the frame is the last frame of a sequence. If not, the process then ends in block B522A. If yes, then in block B524, an appropriate header/trailer is added to the aggregation data unit and the aggregated frame thus formed is provided to the transport layer 49F for further processing.

The aggregation module 51 then determines in block B526, if the frame is part of the last sequence for the exchange. If not, the process ends in block B526A. If it is the last sequence of the exchange, then in block B528, the flow for the exchange is deleted from data structure 53 and the process ends.

The embodiments disclosed herein have various advantages. For example, because frames are aggregated, the transport layer stack has to process fewer frames, reducing the overall processing time. The number of interrupts for processing individual frames is also reduced, which results in better utilization of the computing resources.

It is noteworthy that although the embodiments described above are based on initiator and target adapters, the adaptive embodiments can be used by any network device, for example, a switch port or other similar devices.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:
1. A machine implemented method, comprising;
receiving a frame as part of an input/output (I/O) exchange at a network device coupled to a computing system to read or write information;

determining that the frame meets a first level eligibility criterion for aggregation; wherein the frame is eligible for aggregation when the frame is a data frame for the I/O exchange identified as a large I/O operation; and a frame header meets an eligibility criteria;

when the frame does not meet the first level eligibility criterion and an active aggregation exists for the exchange, then a previous aggregation data unit for the exchange with an appended header and the received frame are sent to a transport layer for further processing;

when the frame meets the first level eligibility criterion, checking a data structure maintained by the network device to determine that an aggregation flow exists for the exchange;

determining that the frame meets an active aggregation criterion, when an active aggregation and the aggregation flow exists for the exchange;

aggregating a payload of the frame to an existing aggregation data unit when the active aggregation criterion is met; and sending the existing aggregation data unit with the aggregated payload and an appended header as an aggregated frame to the transport layer when the frame is the last frame of a sequence.

2. The method further comprising:
when the frame does not meet the first level eligibility criterion and the active aggregation does not exist for the exchange, then the received frame is sent to the transport layer for further processing.

3. The method of claim 1, further comprising:
starting the aggregation flow, when one does not exist for the exchange and using the received frame as a first frame for a new aggregation data unit.

4. The method of claim 1, wherein when the active aggregation does not exist for the exchange, then the frame that meets the first level eligibility criterion becomes a first frame for a new aggregation data unit in an aggregation buffer.

5. The method of claim 1, wherein when the active aggregation criterion is not met, then a previous aggregation data unit with an appended header is sent to the transport layer and a payload of the received frame becomes a first frame for a new aggregation data unit.

6. The method of claim 1, wherein when the active aggregation criterion is met, state information for the aggregation flow is updated at the data structure by the network device.

7. The method if claim 1, wherein the aggregation flow is deleted from the data structure when the received frame is a last frame of a last sequence of the exchange.

8. The method of claim 1, wherein the active aggregation criteria is met when the frame has a same source and destination of a first frame for the aggregation data unit for the I/O exchange; has a same sequence identifier as that of the first frame for the aggregation data unit; has a sequence count greater than one from a last frame of the aggregation data unit; has a same response and originator identifier as that of the first frame of the aggregation data unit and includes an expected relative offset value.

9. The method of claim 1, wherein the frame is a Fibre Channel frame.

10. The method of claim 1, wherein when the frame is a Fibre Channel over Ethernet frame, then a media access control (MAC) header value matches MAC addresses for a source and destination of a first frame of the aggregation data unit.

11. The method of claim 1, wherein the data structure is used to track aggregation for a plurality of I/O exchanges that are categorized as large I/O operations and associated with a plurality of I/O requests.

12. The method of claim 1, wherein the network device is a host bus adapter configured for handling storage traffic.

13. The method of claim 1, wherein the network device is a converged adapter configured for handling storage and network traffic.

14. A machine implemented method, comprising:
receiving a frame as part of an input/output (I/O) exchange at a network device coupled to a computing system;

determining that the frame meets a first level eligibility criterion for aggregation; wherein the frame is eligible for aggregation when the frame is a data frame for the I/O exchange identified as a large I/O operation; and a frame header meets an eligibility criteria;

when the frame does not meet the first level eligibility criterion and an active aggregation exists for the exchange, then a previous aggregation data unit with an appended header and the received frame are sent to a transport layer for further processing;

when the frame does not meet the first level eligibility criterion and the active aggregation does not exist for the exchange, then the received frame is sent to the transport layer for further processing;

when the frame meets the first level eligibility criterion, checking a data structure maintained by the network device to determine that an aggregation flow exists for the exchange;

starting the aggregation flow, when one does not exist for the exchange and using the received frame as a first frame for a new aggregation data unit;

determining that the frame meets an active aggregation criterion, when an active aggregation and the aggregation flow exists for the exchange; wherein when the active aggregation does not exist for the exchange, then a payload of the frame that meets the first level eligibility criterion becomes a first frame for the new aggregation data unit in an aggregation buffer;

aggregating a payload of the frame to an existing aggregation data unit when the active aggregation criterion is met; and sending the existing aggregation data unit with the aggregated payload and an appended header to the transport layer when the frame is the last frame of a sequence.

15. The method if claim 14, wherein the aggregation flow is deleted from the data structure when the sequence is a last sequence of the exchange.

16. The method of claim 14, wherein the active aggregation criteria is met when the frame has a same source and destination of a first frame for the aggregation data unit for the I/O exchange; has a same sequence identifier as that of the first frame for the aggregation data unit; has a sequence count greater than one from a last frame of the aggregation data unit; has a same response and originator identifier as that of the first frame of the aggregation data unit and includes an expected relative offset value.

17. The method of claim 14, wherein the frame is a Fibre Channel frame.

18. The method of claim 14, wherein when the frame is a Fibre Channel over Ethernet frame, then a media access control (MAC) header value matches MAC addresses for a source and destination of a first frame of the aggregation data unit.

19. The method of claim 14, wherein the data structure is used to track aggregation for a plurality of I/O exchanges that are categorized as large I/O operations and associated with a plurality of I/O requests.

20. The method of claim 14, wherein the network device is a host bus adapter configured for handling storage traffic or a converged adapter configured for handling storage and network traffic.

21. A system comprising:
   a computing system coupled to a network device that receives a frame for an input/output (I/O) exchange via a network connection;
   wherein the network device includes an aggregator module that is configured to:
   determine that the frame meets a first level eligibility criterion for aggregation; wherein the frame meets the first level eligibility criterion when the frame is a data frame for the I/O exchange identified as a large I/O operation; and a frame header meets an eligibility criteria;
   wherein when the frame does not meet the first level eligibility criterion and an active aggregation exists for the exchange, then a previous aggregation data unit with an appended header and the received frame are sent to a transport layer for further processing;
   and
   wherein when the frame meets the first level eligibility criterion, the aggregator module checks a data structure maintained by the network device to determine that an aggregation flow exists for the exchange; determines that the frame meets an active aggregation criterion, when an active aggregation and the aggregation flow exists for the exchange; aggregates a payload of the frame to an existing aggregation data unit when the active aggregation criterion is met; and sends the existed aggregation data unit with the aggregated payload and an appended header to the transport layer when the frame is the last frame of a sequence.

* * * * *

UNITED STATES PATENT AND TRADEMARK OFFICE
CERTIFICATE OF CORRECTION

| | | |
|---|---|---|
| PATENT NO. | : 8,953,608 B1 | Page 1 of 1 |
| APPLICATION NO. | : 13/834838 | |
| DATED | : February 10, 2015 | |
| INVENTOR(S) | : Gaurav Borker | |

It is certified that error appears in the above-identified patent and that said Letters Patent is hereby corrected as shown below:

In the Specification

In column 12, line 1, delete "S_ID" and insert -- S_ID, D_ID, --, therefor.

In column 13, line 48, delete "S_ID" and insert -- S_ID, D_ID, --, therefor.

In column 14, line 10, delete "RXID," and insert -- RX_ID, --, therefor.

In the Claims

In column 15, line 48, in Claim 7, delete "if" and insert -- of --, therefor.

In column 16, line 49, in Claim 15, delete "if" and insert -- of --, therefor.

Signed and Sealed this
Twenty-eighth Day of July, 2015

Michelle K. Lee
*Director of the United States Patent and Trademark Office*